Patented July 9, 1935

2,007,198

UNITED STATES PATENT OFFICE 2,007,198

MANUFACTURE OF FLUORATED ALIPHATIC COMPOUNDS

Albert L. Henne, Columbus, Ohio, assignor, by mesne assignments, to General Motors Corporation, a corporation of Delaware No Drawing. Application January 30, 1931, Serial No. 512,472

15 Claims. (Cl. 260—162)

This invention relates to chemical processes for the manufacture of fluoro and/or halo-fluoro derivatives of aliphatic hydrocarbons, and more particularly, of halogen derivatives of the methane homologs having relatively high melting points.

Recently a group of compounds, known generally as halo-fluoro derivatives of aliphatic hydrocarbons, has become of importance due to their non-toxic, non-inflammable properties. Most of these halo-fluoro derivatives heretofore obtained have been derivatives of methane, or derivatives of methane homologs liquefiable at reasonably low temperatures by the application of heat.

My present invention has for its objects to provide a process or processes for the manufacture of fluoro and/or halo-fluoro derivatives of aliphatic hydrocarbons of the methane homologs, particularly halo-fluoro derivatives from those homologs whose melting points are higher than the temperatures at which it is advantageous to carry out the fluoration reaction.

A further object of my invention is to provide a process or processes whereby the halogen derivatives of the methane homologs whose melting points are relatively high may have their melting points reduced so that they may be liquefied at reasonably low temperatures and so that they may be fluorated in the liquid state by intimate contact with some fluorating agent.

Hexachloroethane is an example of one type of compound which may be fluorated according to the present invention. This compound has a boiling point which is lower than its melting point and will consequently pass directly from a solid to a gas by the application of heat.

Hexabromoethane, $C_2Br_6$ is an example of another type of compound which may be fluorated according to the present invention. This compound has a melting point higher than the temperature at which it is desirable to carry out the fluoration reaction and higher than the temperature at which it is stable.

As a specific example, hexachloroethane is fluorated to produce trifluorotrichloroethane. Hexachloroethane, $C_2Cl_6$, has a melting point (about 187° C.) higher than its boiling point (about 182° C.) and in the present example the melting point is reduced to approximately 130° C. so that fluoration may be carried out.

The addition of 75 parts of antimony pentachloride to 213 parts of hexachloroethane, or the addition of 57 parts of antimony trichloride and 17 parts of chlorine to 213 parts of hexachloroethane, lowers the melting point to about 130° C.

Fluoration is brought about by the addition to the mixture of 360 parts of antimony trifluoride, $SbF_3$. A lowering of the melting point and the fluoration are here carried out in the same reaction chamber.

When mixed in these proportions and slightly heated, the mixture will become a liquid. In this liquid state, the $C_2Cl_6$ is fluorated by the $SbF_3$ under the conditions of temperature and pressure in the dephlegmator to produce the desired halofluoro derivative of ethane.

In order to obtain trichlorotrifluoroethane, dephlegmation and control of the delivery of the reaction products are employed. The dephlegmator temperature is about 48° C. and the working pressure is about 1 atmosphere. These are the optimum conditions for producing $C_2Cl_3F_3$.

The dephlegmator returns to the reaction chamber the partially fluorated compound such as difluorotetrachloroethane and any unacted upon raw materials, and these compounds will be further fluorated to the desired derivative, $C_2Cl_3F_3$.

As the reaction in the autoclave or the reaction chamber proceeds, the liquefied reagents may separate into two layers and for this reason it is sometimes advantageous to provide the autoclave with some means for mechanically or otherwise stirring the mixture to increase the surface of contact.

While I have disclosed a specific example of my process for obtaining $C_2Cl_3F_3$ by dephlegmating at a temperature of substantially 48° C. at atmospheric pressure, the process can be carried out at a higher or lower pressure with a corresponding change in temperature. The temperature and pressure of dephlegmation approximates the vapor pressure characteristics of the desired product.

Also while I have described a specific example of manufacture of trichlorotrifluoroethane, other halo-chloro derivatives of ethane are obtained by utilizing hexachloroethane as the raw material. One such example is dephlegmation at a temperature of substantially 92° C. at about atmospheric pressure or at a lower temperature and slightly sub-atmospheric pressure to obtain $C_2Cl_4F_2$. To obtain any of the fluorine compounds, $C_2Cl_5F$, $C_2Cl_4F_2$, $C_2Cl_3F_3$, or $C_2Cl_2F_4$, the temperature and pressure conditions of dephlegmation are varied to approximate the vapor pressure characteristics of the compound desired.

The compound $C_2Cl_3F_3$ is a water white liquid boiling at 117° F. and has a density of 1.58 at 70° F.

The compound $C_2Cl_2F_4$ is normally a gas and has a boiling point of 39° F.

My invention is not limited to the fluoration of the chloro derivatives of ethane such as $C_2Cl_6$ nor to the fluoration of a derivative whose melting point is higher than its boiling point. For example, hexabromoethane, $C_2Br_6$, may be fluorated. This compound has a relatively high melting point, higher than the temperature at which it is desired to carry out the fluoration reaction and higher than the temperature at which it is stable. According to my present invention the melting point is first reduced by the addition of a substance ($SbCl_5$, or $SbCl_3$ and $Cl$). Fluoration will produce $C_2Br_5F$, $C_2Br_3F_3$, $C_2Br_4F_2$, or $C_2Br_2F_4$. As in the case of the chloro derivatives, the vapor pressure characteristics of the desired product govern the conditions of temperature and pressure conditions of dephlegmation.

$C_2Br_4Cl_2$ is another high melting compound. This has a melting point higher than the temperature at which it is stable. By mixing therewith $SbCl_5$, or $SbCl_3$, and $Cl$, its melting point is reduced to the point where $C_2Br_4Cl_2$ may be fluorated with safety. The fluoration of $C_2Br_4Cl_2$ may produce $C_2Br_3Cl_2F$ and/or $C_2Br_4ClF$, according to conditions of dephlegmation as heretofore set forth. Other methane homologs than ethane derivatives can be fluorated. For example, $C_3Cl_8$ or $C_3Br_8$ may be fluorated to produce $C_3F_3Cl_5$, $C_3F_4Cl_4$, and $C_3F_5Cl_3$ and the corresponding bromine compounds, the melting points being first reduced to a reasonably low temperature.

While I have disclosed various specific examples of my process for obtaining different halofluoro derivatives of methane homologs, it should be understood that in its generic aspect my invention contemplates the fluoration of all halo derivatives of aliphatic hydrocarbons whose melting points are relatively high or higher than their boiling points by first reducing the melting points to a workable temperature for fluoration and then fluorating the derivative by a fluorating agent.

What is claimed is as follows:

1. The method of manufacturing a halo-fluoro derivative from a halogenated aliphatic hydrocarbon, containing halogen other than fluorine and having a melting point higher than the temperature at which the said hydrocarbon tends to decompose, which comprises lowering the melting point of the hydrocarbon below the temperature at which it is unstable, liquefying the hydrocarbon and fluorating the liquefied derivative to replace at least some of the halogen other than fluorine with fluorine.

2. The method of manufacturing a halo-fluoro derivative from a halogenated hydrocarbon containing halogen other than fluorine and having a melting point higher than its boiling point, which comprises mixing the halogen derivative with a substance capable of lowering its melting point, liquefying the mixture, and fluorating the liquefied hydrocarbon to replace at least some of the halogen other than fluorine with fluorine.

3. In the manufacture of halo-fluoro derivatives from halogenated hydrocarbons containing a halogen other than fluorine and having relatively high melting points, that step which consists in lowering the melting point of the hydrocarbon to a temperature convenient for carrying out fluoration.

4. The method which comprises mixing with the $C_2Br_6$ a substance capable of lowering its melting point, liquefying the $C_2Br_6$ and fluorating the liquefied $C_2Br_6$.

5. The method of manufacturing a halo-fluoro derivative from a halogenated hydrocarbon containing halogen other than fluorine and having a melting point higher than the temperature at which it is desired to carry out the reaction, it consists in lowering the melting point of the hydrocarbon to the temperature desired, liquefying the hydrocarbon, and contacting the hydrocarbon with a fluorating agent, driving off the reaction product, separating from the reaction products any insufficiently fluorated compound and making fluorine substitution in said insufficiently fluorated compound.

6. In the manufacture of halo-fluoro derivatives from halogenated hydrocarbons containing halogen other than fluorine and having relatively high melting points, that step which consists in mixing with the hydrocarbon a substance capable of lowering the melting point of the hydrocarbon.

7. In the manufacture of halo-fluoro derivatives from halogenated hydrocarbons containing halogen other than fluorine and having melting points higher than their boiling points, that step which consists in mixing with the hydrocarbon a substance capable of lowering the melting point of the hydrocarbon below its boiling point.

8. The method of manufacturing $C_2Cl_3F_3$ from $C_2Cl_6$ which consists in mixing therewith a compound to lower the melting point of the $C_2Cl_6$ below its boiling point, liquefying the $C_2Cl_6$ and fluorating the $C_2Cl_6$.

9. A chemical compound having the formula $CCl_2F$—$CClF_2$.

10. A chemical compound having the formula $CClF_2$—$CClF_2$.

11. The method of manufacturing a halofluoro derivative from a halogenated methane homologue containing halogen other than fluorine and having a melting point higher than the temperature at which it is desired to carry out the reaction which consists in lowering the melting point of the halogenated methane homologue to the temperature desired, liquefying the halogenated methane homologue and fluorating the liquefied halogenated methane homologue.

12. The method of manufacturing a halofluoro derivative from a halogenated ethane containing halogen other than fluorine and having a melting point higher than the temperature at which it is desired to carry out the reaction which consists in lowering the melting point of the halogenated ethane to the temperature desired, liquefying the halogenated ethane and fluorating the liquefied halogenated ethane.

13. The method of manufacturing $C_2Cl_3F_3$ from $C_2Cl_6$ which consists in mixing therewith an antimony chloride to lower the melting point of the $C_2Cl_6$ below its boiling point, liquefying the $C_2Cl_6$ and fluorating the $C_2Cl_6$ with antimony fluoride.

14. The method of manufacturing a halofluoro derivative from a halogenated hydrocarbon containing halogen other than fluorine and having a melting point higher than its boiling point, which comprises mixing the halogen derivative with an antimony chloride capable of lowering its melting point, liquefying the mixture and fluorating the liquefied hydrocarbon with antimony fluoride to replace at least some of the halogen other than fluorine with fluorine.

15. The method which comprises mixing with the $C_2Br_6$ an antimony chloride capable of lowering its melting point, liquefying the $C_2Br_6$ and fluorating the liquefied $C_2Br_6$ with antimony fluoride.

ALBERT L. HENNE.